(12) United States Patent
Mori

(10) Patent No.: US 10,353,458 B2
(45) Date of Patent: Jul. 16, 2019

(54) POWER SUPPLY SYSTEM

(71) Applicant: Murata Manufacturing Co., Ltd., Nagaokakyo-shi, Kyoto-fu (JP)

(72) Inventor: Michiya Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/204,034

(22) Filed: Nov. 29, 2018

(65) Prior Publication Data

US 2019/0094951 A1    Mar. 28, 2019

Related U.S. Application Data

(63) Continuation of application No. PCT/JP2017/017776, filed on May 11, 2017.

(30) Foreign Application Priority Data

Jun. 2, 2016  (JP) .................................. 2016-110981

(51) Int. Cl.
*H02J 3/38* (2006.01)
*H02M 3/158* (2006.01)
(Continued)

(52) U.S. Cl.
CPC ............ *G06F 1/3296* (2013.01); *G05F 1/465* (2013.01); *H02M 3/04* (2013.01)

(58) Field of Classification Search
CPC ...... H02J 1/10; H02J 7/34; H02J 3/38; H02M 3/1584; H02M 3/285; H02M 7/153; H02M 7/17; H02M 7/23
See application file for complete search history.

(56) References Cited

U.S. PATENT DOCUMENTS 6,433,522 B1 * 8/2002 Siri ........................... G05F 1/67
320/101
7,928,701 B2    4/2011 Usui
(Continued)

FOREIGN PATENT DOCUMENTS

| JP | 2005083195 A | 3/2005 |
| JP | 2009027887 A | 2/2009 |
| JP | 2012210013 A | 10/2012 |

OTHER PUBLICATIONS

International Search Report issued for PCT/JP2017/017776, dated Aug. 1, 2017.
(Continued)

*Primary Examiner* — Gary L Laxton
(74) *Attorney, Agent, or Firm* — Arent Fox LLP

(57) ABSTRACT

A power supply system that includes a converter unit, a battery module connected in parallel to the converter unit and configured to supply power to a load, and a monitoring and controlling device configured to deactivate one or more of converter sections and to start driving the inactive converter section(s) in accordance with a light or heavy state of the load. When the output voltage of the battery module becomes higher than the output voltage of the converter unit when one or more of the converter sections are inactive, the output voltage of the battery module is supplied to the load. The monitoring and controlling device starts driving the inactive converter section(s) by the time the output voltage of the battery module exceeds the output voltage of the converter unit.

18 Claims, 6 Drawing Sheets

(51) Int. Cl.
    *G06F 1/3296*     (2019.01)
    *H02M 3/04*     (2006.01)
    *G05F 1/46*     (2006.01)

(56) References Cited

U.S. PATENT DOCUMENTS

| | | | |
|---|---|---|---|
| 9,093,861 B2* | 7/2015 | Nakano | H02J 9/061 |
| 2005/0270812 A1 | 12/2005 | Vinciarelli | |
| 2007/0029799 A1 | 2/2007 | Motohiro et al. | |
| 2009/0027931 A1 | 2/2009 | Usui | |
| 2015/0180233 A1* | 6/2015 | Yamada | H02J 1/08 |
| | | | 307/23 |
| 2016/0006242 A1* | 1/2016 | Yamada | H02J 9/06 |
| | | | 307/65 |
| 2018/0076657 A1* | 3/2018 | Nishimura | H02J 9/06 |

OTHER PUBLICATIONS

Written Opinion of the International Searching Authority issued for PCT/JP2017/017776, dated Aug. 1, 2017.

* cited by examiner

POWER SUPPLY SYSTEM

CROSS REFERENCE TO RELATED APPLICATIONS

The present application is a continuation of PCT/JP2017/017776 filed May 11, 2017, which claims priority to Japanese Patent Application No. 2016-110981, filed Jun. 2, 2016, the entire contents of each of which are incorporated herein by reference.

TECHNICAL FIELD

The present disclosure relates to a power supply system that assists supplying voltage to a load.

BACKGROUND

Patent Document 1 (identified below) discloses a power supply device that includes a plurality of power supply units connected in parallel and that controls the number of operating power supply units in accordance with a load current. This power supply device can maintain high power supply conversion efficiency even in light-load states and achieve energy conservation by preventing a decrease in power conversion efficiency in light-load conditions.

Patent Document 1: Japanese Unexamined Patent Application Publication No. 2012-210013.

The power supply device in Patent Document 1 deactivates one or more power supply units during light-load conditions. If the load suddenly changes from light to heavy in the state where one or more power supply units are inactive, they may be unable to be quickly activated, and the power supply device may fail to support the suddenly changing load current. In this case, voltage supplied to the load decreases. In particular, if the load is an information processing system apparatus, such as a server, the voltage decrease may cause unstable operations. For this reason, the power supply device in Patent Document 1 is not suited for information processing system apparatuses, such as servers.

SUMMARY OF THE INVENTION

Accordingly, it is an object of the present disclosure to provide a power supply system capable of achieving enhanced power conversion efficiency during light-load conditions and of supplying stable voltage to a load.

Thus, a power supply system according to an exemplary embodiment is disclosed that includes a converter unit, a power storage device, a driving stop section, and a driving start section. The converter unit includes a plurality of converters connected in parallel and a current control section for balancing output currents of the plurality of converters and is configured to transform an input voltage and output the transformed voltage to a load. The power storage device is connected in parallel to the converter unit with respect to the load and is configured to supply power to the load. The driving stop section is configured to deactivate one or more of the plurality of converters in accordance with a load current and current output capabilities of the converters. The driving start section is configured to start driving the inactive converter(s) among the plurality of converters. The power storage device includes an output current value obtaining section configured to obtain an output current value of the converter unit. An output voltage of the power storage device becomes higher than an output voltage of the converter unit in a state where the one or more of the plurality of converters are deactivated by the driving stop section, the output voltage of the power storage device is supplied to the load. The driving start section starts driving the inactive converter(s) at a point when the value obtained by the output current value obtaining section is at or above a load factor of 50% with respect to rated load of the converter unit.

In this configuration, the converter is deactivated during light-load conditions, the loss is reduced, and the power conversion efficiency can be improved. If the load changes even to a heavy state when the converter is inactive, because the power storage device assists supplying power, shortages of power supplied to the load can be avoided. Accordingly, stable voltage can be supplied to the load. In addition, by activating the inactive converter in a range where the load factor of the operating converter unit with respect to the rated load is at or above 50%, the load factor of each of the converters can be reduced, and they are enabled to operate in a high efficiency range. In addition, if the converter cannot be quickly activated, the power storage device assists supplying power until it is activated. Consequently, the effects of deactivation of the converter can be suppressed.

According to an exemplary aspect, the converter unit may output a constant voltage. The power storage device may perform control for raising the output voltage with an increase in the output current value obtained by the output current value obtaining section when the output current value is at or above a first threshold. The control for raising the output voltage by the power storage device may trigger the driving start section to start driving the inactive converter(s).

In this configuration, the timing of activating the inactive converter(s) is matched with control for raising the output voltage performed by the power storage device. This enables optimizing the time period for which the power storage device assists supplying power.

The converter unit may be set so as to output a constant voltage and to continue being driven while reducing the output voltage in a heavy load range. The driving start section may start driving the inactive converter(s) after the output voltage of the converter unit starts decreasing.

In this configuration, driving the inactive converter(s) is started in accordance with the output current value obtained by the output current value obtaining section while the power storage device assists supplying power without having to control the output voltage of the power storage device. This enables suppressing the effects of deactivation of the converter.

In another aspect, a power supply system is disclosed that includes a converter unit, a power storage device, a driving stop section, and a driving start section. The converter unit includes a plurality of converters connected in parallel and a current control section for balancing output currents of the plurality of converters and is configured to transform an input voltage and output the transformed voltage to a load. The power storage device is connected in parallel to the converter unit with respect to the load and is configured to supply power to the load. The driving stop section is configured to deactivate one or more of the plurality of converters in accordance with a load current and current output capabilities of the converters. The driving start section is configured to start driving the inactive converter(s) among the plurality of converters. When an output voltage of the power storage device becomes higher than an output voltage of the converter unit in a state where the one or more of the plurality of converters are deactivated by the driving stop section, the output voltage of the power storage device is supplied to the load. The driving start section detects occurrence of an output current in the power storage device and starts driving the inactive converter(s).

In this configuration, the converter is deactivated during light-load conditions, the loss is reduced, and the power conversion efficiency can be enhanced. If the load changes even to a heavy state when the converter is inactive, because the power storage device assists supplying power, shortages of power supplied to the load can be avoided. This enables stable voltage to be supplied to the load. In addition, because the output current from the power storage device triggers activation of the inactive converter(s), the circuitry can be simplified. In addition, if the converter cannot be quickly activated, the power storage device assists supplying power until it is activated. Consequently, the effects of deactivation of the converter can be suppressed.

The converter unit may be set so as to output a constant voltage and to continue being driven while reducing the output voltage in a heavy load range.

In this configuration, the operating converter unit enters a heavy load range, the output voltage becomes lower than the output voltage of the power storage device, and as a result of this, an output current occurs from the power storage device. Because this output current triggers activation of the inactive converter unit, it is not necessary to include a dedicated additional circuit, and the effects of deactivation of the converter can be suppressed.

When two or more of the converters are inactive, the driving start section may start driving all of the inactive converters.

In this configuration, in starting driving the plurality of inactive converters, all of the converters is subjected to the driving start control. Therefore, the control can be simple.

When two or more of the converters are inactive, the driving start section may start driving all of the inactive converters in units of one or any number of converters in accordance with the load.

In this configuration, the operations of converters that would operate needlessly are avoided, the loss is reduced, and the power conversion efficiency can be improved.

The driving stop section may deactivate the plurality of converters one by one. The number of converts in action where the power conversion efficiency is high may be calculated, and a plurality of converters may be deactivated at once so that the calculated number of converters are in action.

In this configuration, the number of converters deactivated can be minimized, and excessive discharging from the power storage device can be suppressed.

According to the exemplary embodiments, one or more converters are deactivated during light-load conditions, the load factor of a converter continuing its operation is increased, and it is enabled to operate in a higher efficiency range. This can reduce the loss and enhance the power conversion efficiency. A stable voltage can be supplied to the load. In addition, if the load suddenly changes to a heavy state, the power storage device assists supplying power until the inactive converter is activated, and the effects of deactivation of the converter, for example, decrease in voltage supplied to the load, can be suppressed.

DETAILED DESCRIPTION OF EMBODIMENTS (First Exemplary Embodiment)

Figure 1:
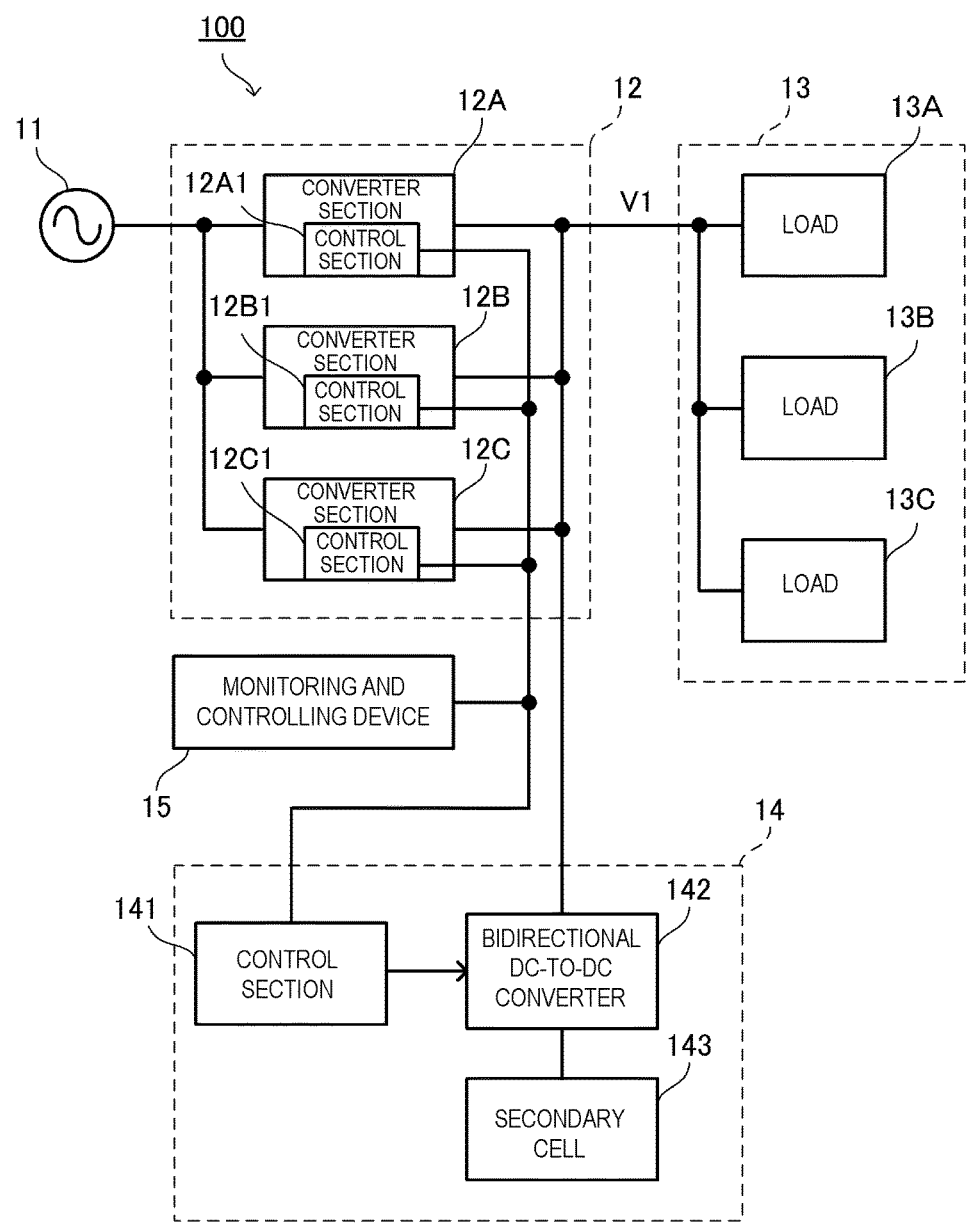
FIG. 1 is a block diagram of a power supply system according to a first exemplary embodiment.

FIG. 1 is a block diagram of a power supply system 100 according to the present embodiment.

The power supply system 100 includes a commercial power supply 11, a converter unit 12, a load 13A, a load 13B, a load 13C, a battery module 14, and a monitoring and controlling device 15.

One example of the loads 13A, 13B, and 13C may be a blade server and be housed in a casing. The loads 13A, 13B, and 13C are connected in parallel and are connected to the converter unit 12. The loads 13A, 13B, and 13C receive power from the converter unit 12. Hereinafter, the loads 13A, 13B, and 13C are expressed as load 13.

The converter unit 12 includes a converter section 12A, a converter section 12B, and a converter section 12C. Each of the converter sections 12A, 12B, and 12C includes an AC-to-DC converter. The converter sections 12A, 12B, and 12C are connected in parallel between the commercial power supply 11 and load 13. The converter sections 12A, 12B, and 12C include control sections 12A1, 12B1, and 12C1, respectively, configured to perform switching control for their respective AC-to-DC converters. The control sections 12A1, 12B1, and 12C1 are one example of a current control section or current controller, according to the exemplary aspect.

Each of the converter sections 12A, 12B, and 12C converts an alternating voltage (e.g., 200 V) from the commercial power supply 11 into a direct-current voltage (e.g., 12 V) and supplies it to the load 13. Hereinafter, the converter sections 12A, 12B, and 12C are described as outputting a constant voltage V1.

The converter unit 12 achieves redundancy by the parallel connection of the converter sections 12A, 12B, and 12C. If one of the converter sections 12A, 12B, and 12C is deactivated because of a breakdown or the like, the remaining converter sections can supply power to the load 13. Thus, the faulty converter section can be replaced in the state where the converter unit 12 is continuously in action.

Each of the converter sections 12A, 12B, and 12C has the function of comparing its own output current to output currents of the other converter sections and balancing the output current with them (so-called current sharing function). That is, the output currents of the converter sections 12A, 12B, and 12C are the same. This function enables balancing the amount of an output current for each of the converter sections 12A, 12B, and 12C and thus reduces the stress. Therefore, their lifespans can be extended.

The battery module 14 includes a control section 141, a bidirectional DC-to-DC converter 142, and a secondary cell 143. One example of the secondary cell 143 may be a lithium-ion battery. The battery module 14 is one example of a power storage device according to the exemplary embodiment.

The bidirectional DC-to-DC converter 142 is connected between an output portion of the converter unit 12 and the secondary cell 143. One example of the bidirectional DC-to-DC converter 142 may be a circuit in which a step-up chopper and a step-down chopper are combined. The bidirectional DC-to-DC converter 142 bidirectionally converts voltage between the output portion of the converter unit 12 and the secondary cell 143. The bidirectional DC-to-DC converter 142 outputs a discharge voltage of the secondary cell 143 to the load 13 and charges the secondary cell 143 with the output voltage of the converter unit 12.

One example of the control section 141 may be a microprocessor. The control section 141 receives a current sharing signal as needed, performs switching controls for the bidirectional DC-to-DC converter 142, and controls charging and discharging of the secondary cell 143 described above. The current sharing signal includes output current values of the converter sections 12A, 12B, and 12C balanced by the current sharing function. The control section 141 is one example of ab output current value obtaining section or an output current value detector according to the exemplary embodiment.

Figure 2:
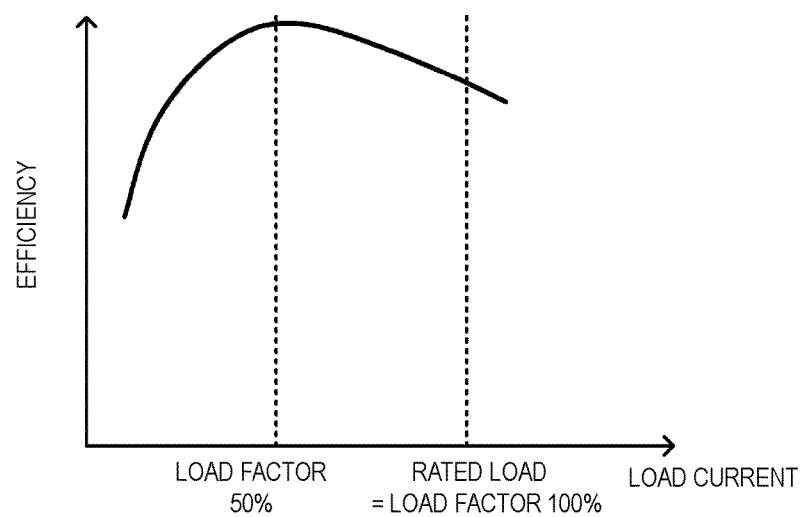
FIG. 2 illustrates a relationship between a load current and efficiency.
Figure 3:
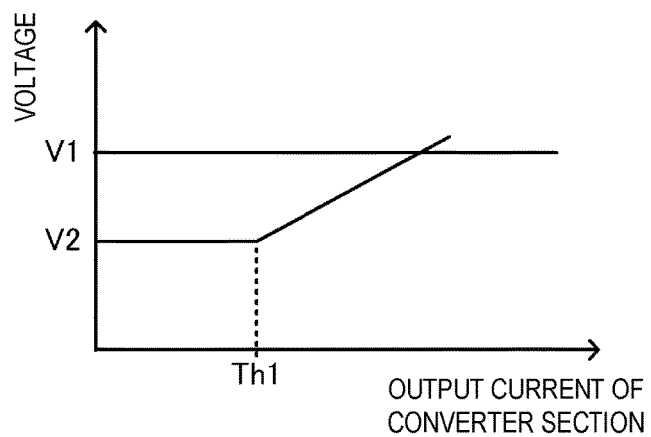
FIG. 3 illustrates output voltage characteristics of a bidirectional DC-to-DC converter.

FIG. 2 illustrates a relationship between a load current and efficiency. FIG. 3 illustrates output voltage characteristics of the bidirectional DC-to-DC converter 142. The voltage characteristics illustrated in FIG. 3 indicate target values of voltage output from the bidirectional DC-to-DC converter 142. Here, the output of the bidirectional DC-to-DC converter 142 is the output to the load 13. Hereinafter, the output voltage of the battery module is expressed as V2.

While the output current value included in the current sharing signal does not exceed a threshold Th1, the load 13 is light. One example of the threshold Th1 is a current value when the load factor to rated load is 50%. The threshold Th1 is one example of a first threshold according to the exemplary embodiment. As illustrated in FIG. 2, the converter sections 12A, 12B, and 12C in this example are set such that they operate at high efficiency when the load factor is 50%. Thus, power supplied to the load 13 is satisfactorily provided by the output power of the converter unit 12. Additionally, to avoid the power conversion efficiency decreases under the situation where the converter sections 12A, 12B, and 12C operate in a light load range, for example, by deactivating one of the converter sections, the load factor of the remaining two converter sections is increased, and they are able to operate in a load range with higher efficiency. In this case, the control section 141 may control the bidirectional DC-to-DC converter 142 such that the secondary cell 143 is charged with voltage output from the converter unit 12 that can afford to provide voltage.

When the output current value included in the current sharing signal exceeds the threshold Th1, the load 13 shifts to a heavy load. In other words, the state where the load is larger than the threshold Th1 is the heavy load state. Then, the control section 141 performs switching control for the bidirectional DC-to-DC converter 142 such that the output voltage of the bidirectional DC-to-DC converter 142 linearly rises as illustrated in the voltage characteristics in FIG. 3. When the control section 141 starts the operation of raising the output voltage of the bidirectional DC-to-DC converter 142, the control section 141 outputs a start notification signal to the monitoring and controlling device 15.

When the output voltage of the bidirectional DC-to-DC converter 142 rises and becomes higher than the constant voltage V1, which is normally output from the converter unit 12, supplying power from the bidirectional DC-to-DC converter 142 to the load 13 starts. If the load 13 suddenly changes from light to heavy when at least one of the converter sections 12A, 12B, and 12C is inactive, although the inactive converter section cannot be activated, because the battery module 14 assists supplying power until that converter section is activated, a shortage of power supplied to the load 13 does not occur. Thus, the load 13 can operate stably.

In the present embodiment, the period from the time the output current value exceeds the threshold Th1 to the time the output voltage of the bidirectional DC-to-DC converter 142 exceeds the constant voltage V1 is shorter than the period to the time the inactive converter section goes into action. The periods can be changed in accordance with the characteristics of the secondary cell 143, switching control for the bidirectional DC-to-DC converter 142, and the like.

The monitoring and controlling device 15 includes a microprocessor and the like and performs control for determining whether the load 13 is light or heavy, for stopping operations of the converter sections 12A, 12B, and 12C, for activating the inactive (i.e., deactivated) converter sections 12A, 12B, and 12C, and the like. The monitoring and controlling device 15 is one example of a driving stop section or a driving stop controller and a driving start section or a driving start controller according to an exemplary aspect of the present disclosure.

The monitoring and controlling device 15 receives a current sharing signal from the converter sections 12A, 12B, and 12C, for example, and determines whether the load 13 is light or heavy. Normally, the output currents of the converter sections 12A, 12B, and 12C are the same. Thus, the monitoring and controlling device 15 can obtain a load current from an output current value included in the current sharing signal and can determine whether the load 13 is light or heavy.

The power supply system 100 may include a detection circuit (e.g., resistor or the like) for detecting a load current. In this case, the monitoring and controlling device 15 may determine whether the load 13 is light or heavy from a result of detection by that detection circuit.

When the load 13 is in a light load state, the monitoring and controlling device 15 stops the operations of at least one of the converter sections 12A, 12B, and 12C on the basis of the load current and the current output capabilities of the converter sections 12A, 12B, and 12C. In light-load conditions, the load current is small. Thus, in the light-load conditions, the monitoring and controlling device 15 deactivates at least one of the converter sections 12A, 12B, and 12C and causes the remaining converter sections 12A, 12B, or 12C to operate in a load state where it can operate at optimum efficiency, and the loss is reduced. This leads to improved power conversion efficiency.

There are certification standards, including "80 PLUS (registered trademark)," for a power supply system used in a blade server or the like, and characteristics in which the power conversion efficiency is the highest at a load factor of 50% to rated load are required (see FIG. 2). Accordingly, when the load factor exceeds 50%, the conversion efficiency as the power supply system is more enhanced by activating the inactive converter section and lowering the load factor of each of the converter sections.

After a sudden load change, power is supplied from the secondary cell 143 to the load 13. After the inactive converter section goes into action, supplying the power from the secondary cell 143 stops. Thus, excessive discharging from the secondary cell 143 can be prevented, and power can be saved in the secondary cell 143 to prepare for power supply shortages in the power supply system 100.

The number of converter sections deactivated by the monitoring and controlling device 15 can be changed in accordance with the number of converter sections included in the converter unit 12, the load current, or the like. In the case where the monitoring and controlling device 15 deactivates a plurality of converter sections, it may deactivate them all at once, one by one, or the like.

When the monitoring and controlling device 15 receives a start notification signal from the battery module 14 in a state where at least one of the converter sections 12A, 12B, and 12C is inactive, it starts driving the inactive converter section. In the present embodiment, because the battery module 14 supplies power to the load 13 until the inactive converter section is driven, shortages of power supplied to the load 13 can be prevented.

Figure 4:
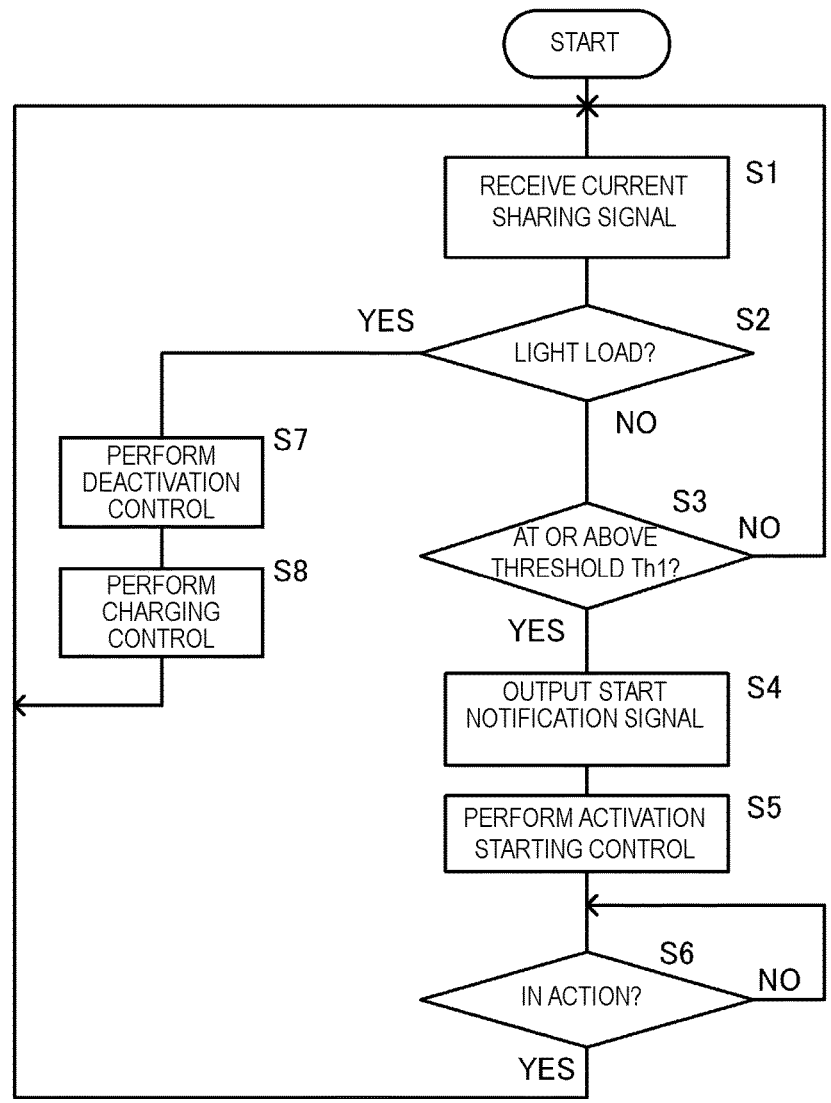
FIG. 4 is a flow chart that illustrates operations of the power supply system.

FIG. 4 is a flow chart that illustrates operations of the power supply system 100.

The monitoring and controlling device 15 receives a current sharing signal while the converter unit 12 operates (S1) and determines whether the load 13 is light or heavy (S2). When it is light (YES at S2), the monitoring and controlling device 15 deactivates at least one of the converter sections 12A, 12B, and 12C (S7), and the battery module 14 performs control for charging the secondary cell 143 with the output voltage of the converter unit 12 (S8).

When the load 13 is not light (NO at S2), the control section 141 in the battery module 14 determines whether the output current value included in the current sharing signal is at or above the threshold Th1 (S3). When the output current value is at or above the threshold Th1 (YES at S3), the control section 141 raises the output voltage of the bidirectional DC-to-DC converter 142 as indicated in the voltage characteristics in FIG. 3 and outputs a start notification signal to the monitoring and controlling device 15 (S4). The monitoring and controlling device 15 starts driving the inactive converter section (S5). The timing of raising the output voltage of the bidirectional DC-to-DC converter 142 and the timing of outputting the start notification signal to the monitoring and controlling device 15 may be based on different thresholds.

When the inactive converter goes into action, the output current per converter decreases. When the output current per converter decreases, the output voltage of the battery module falls in accordance with the characteristics in FIG. 3, "output voltage of converter>output voltage of battery module" is established, and discharging from the secondary cell stops. Thus, excessive discharging from the secondary cell can be prevented.

In this way, the power supply system according to the present embodiment deactivates a converter section when the load 13 is light, reduces the loss, and can improve the power conversion efficiency. If the load suddenly changes when the converter section is inactive, the power supply system performs control such that the output voltage of the battery module 14 rises above the constant voltage V1, and thus supplying power from the battery module 14 to the load 13 automatically starts. Thus, a shortage of power supplied to the load 13 does not occur. Accordingly, the load 13 can operate stably.

In addition, because driving the inactive converter section is started while the secondary cell 143 assists supplying power, if the converter section cannot be quickly activated, the secondary cell 143 assists supplying power until the converter section is activated. Thus, the effects of deactivation of the converter section can be suppressed.

When a plurality of converter sections are inactive, the method for activating them may be changed.

Figure 5:
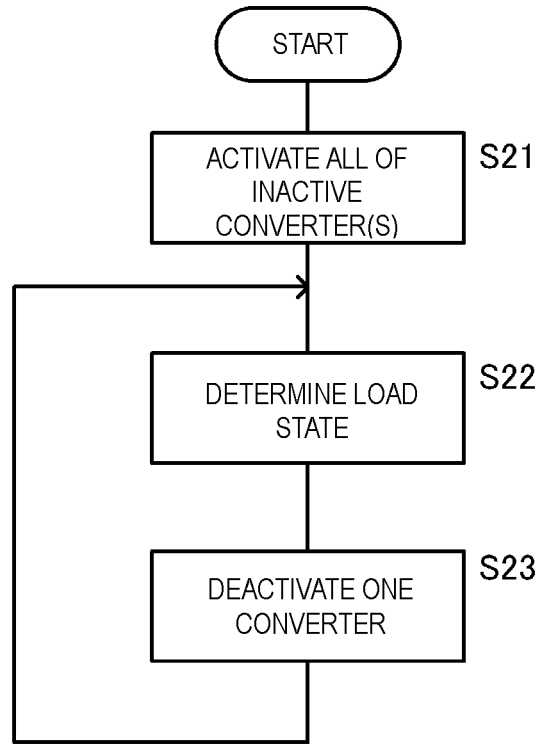
FIG. 5 is a flow chart that illustrates processing in activating one or more inactive AC-to-DC converters.
Figure 6:
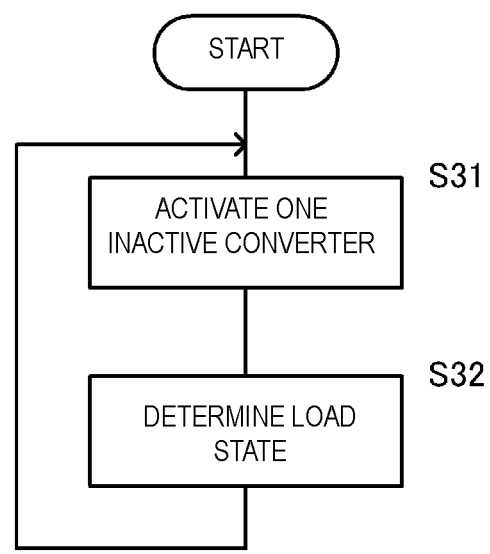
FIG. 6 is a flow chart that illustrates processing in activating an inactive AC-to-DC converter.

FIGS. 5 and 6 are flow charts that illustrate processing in activating one or more inactive converter sections.

In the example illustrated in FIG. 5, the monitoring and controlling device 15 activates all of inactive converter(s) (S21). After that, the monitoring and controlling device 15 determines the load state of the load 13 (S22). At this time, when the output voltage of the converter unit 12 is sufficient for the state of the load 13, the monitoring and controlling device 15 deactivates one converter section (S23). Then, the monitoring and controlling device 15 determines the load state of the load 13 again (S22). When the load factor of the converter unit 12 is still significantly low after the single converter section is deactivated, one more converter section is deactivated (S23). By repeating this process, needless operations of the converter sections are stopped, the loss is reduced, and the load factor of one or more converter sections continuing their operation is increased, and they can operate in a load range with higher efficiency. Accordingly, the power conversion efficiency can be improved.

In the example illustrated in FIG. 6, the monitoring and controlling device 15 activates a single inactive converter section (S31). After that, the monitoring and controlling device 15 determines the load state of the load 13 (S32). When the power supplying capacity of the converter unit 12 is not sufficient, the monitoring and controlling device 15 activates another converter section (S31). In this case, the operations of converters that would operate needlessly are avoided, the loss is reduced, and the power conversion efficiency can be improved.

(Second Exemplary Embodiment)

The present embodiment differs from the first embodiment in the method of starting driving an inactive converter section.

Figure 7:
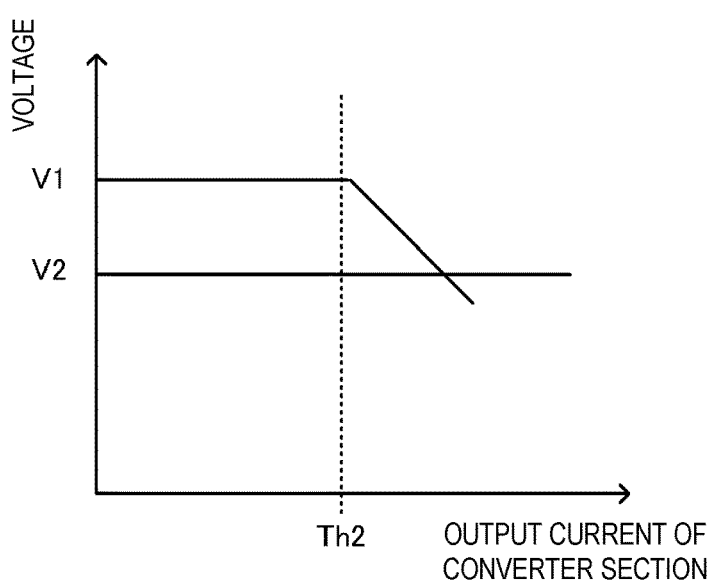
FIG. 7 illustrates output voltage characteristics of a bidirectional DC-to-DC converter.

FIG. 7 illustrates output voltage characteristics of the bidirectional DC-to-DC converter 142. The output voltage characteristics illustrated in FIG. 7 correspond to each of the converter sections 12A, 12B, and 12C. The voltage characteristics illustrated in FIG. 7 indicate target values of the voltage output by the bidirectional DC-to-DC converter 142.

The control section 141 controls the bidirectional DC-to-DC converter 142 such that it outputs the constant voltage V2 independently of the output current value included in the current sharing signal. The voltage V2 is the output voltage of the battery module. It is lower than the constant voltage V1, which is normally output from the converter sections 12A, 12B, and 12C.

Each of the converter sections 12A, 12B, and 12C is subjected to constant-voltage control at which it outputs the constant voltage V1 until the output current reaches the threshold Th2. The threshold Th2 is one example of a second threshold according to the exemplary embodiment. Each of the converter sections 12A, 12B, and 12C has drooping characteristics, and when its output current exceeds the threshold Th2 and the load becomes heavy, overcurrent limitations are imposed thereon to prevent it from being burnt or the like. To maintain the operations of the load 13 and continue supplying power thereto even in a heavy load state, the voltage is reduced in accordance with an increase in the load current.

If the load 13 suddenly changes when at least one of the converter sections 12A, 12B, and 12C is inactive, the output current of the converter sections 12A, 12B, or 12C in action increases, and thus, as previously described, the output voltage decreases. Then, when the output voltage of the converter sections 12A, 12B, and 12C becomes lower than the output voltage V2 of the bidirectional DC-to-DC converter 142, supplying power from the battery module 14 to the load 13 automatically starts. Accordingly, a shortage of power supplied to the load 13 does not occur, and the load 13 can operate stably.

When the output current included in the current sharing signal exceeds the threshold Th2, the monitoring and controlling device 15 starts driving the inactive converter section. As described in the first embodiment, because the deactivated converter section cannot be quickly activated, if the load 13 becomes heavy when the converter section is inactive, a shortage of voltage supplied to the load 13 occurs. Thus, because driving the inactive converter section is started at the timing in which the output voltage starts decreasing, the battery module 14 supplies power to the load 13 until the converter section is driven. Therefore, the effects of the shortage of power supplied to the load 13 can be prevented.

Figure 8:
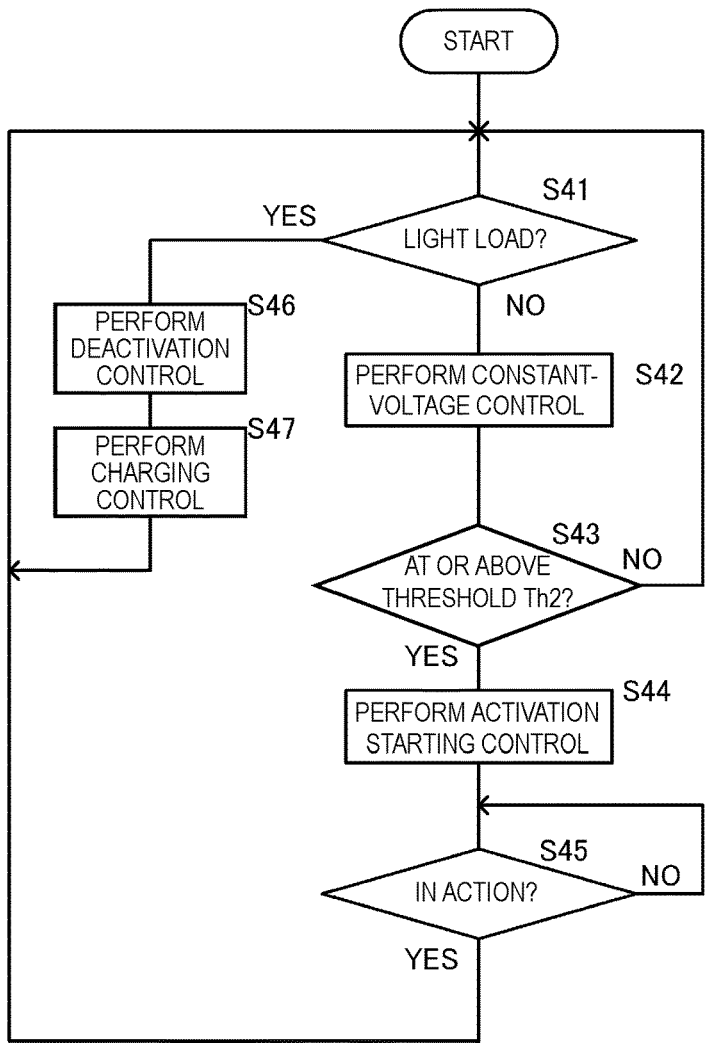
FIG. 8 is a flow chart that illustrates operations of a power supply system.

FIG. 8 is a flow chart that illustrates operations of the power supply system 100.

The monitoring and controlling device 15 determines whether the load 13 is light or not from, for example, the output current value included in the current sharing signal when the converter unit 12 is operating (S41). When it is light (YES at S41), the monitoring and controlling device 15 deactivates at least one of the converter sections 12A, 12B, and 12C (S46), and the battery module 14 performs control for charging the secondary cell 143 with the output voltage of the converter unit 12 (S47).

When the load 13 is not light (NO at S41), the control section 141 in the battery module 14 outputs the constant voltage V2 (S42). When the output current value is at or above the threshold Th2 (YES at S43), the monitoring and controlling device 15 starts driving the inactive converter section (S44).

The monitoring and controlling device 15 determines whether the inactive converter section goes into action (S45). When the converter section is not in action (NO at S45), the monitoring and controlling device 15 performs processing at S45. When it is in action (YES at S45), the output current per converter decreases. When the output current per converter decreases, the output voltage of the converter rises in accordance with the characteristics in FIG. 7, "output voltage of converter>output voltage of battery module" is established, and discharging from the secondary cell stops. Thus, excessive discharging from the secondary cell can be prevented.

In this way, the power supply system according to the present embodiment deactivates a converter section when the load 13 is light, reduces the loss, and can improve the power conversion efficiency. If the load suddenly changes in the state where the converter section is inactive, when the output voltage of the converter section becomes lower than the output voltage V2 of the battery module 14, supplying power from the battery module 14 to the load 13 can be started automatically. Thus, a shortage of power supplied to the load 13 does not occur. Accordingly, the load 13 can operate stably.

In addition, because driving the inactive converter section is started while the secondary cell 143 assists supplying power, if the converter section cannot be quickly activated, the secondary cell 143 assists supplying power until the converter section is activated. Thus, the effects of deactivation of the converter section can be suppressed.

The converter unit 12 or battery module 14 may have the function of the monitoring and controlling device 15 in the above-described embodiments. The converter sections 12A, 12B, and 12C, which are described above as including the AC-to-DC converters, may include DC-to-DC converters when the power supply is a direct-current power supply.

(Third Exemplary Embodiment)

A power supply system according to a third embodiment is described below.

Figure 9:
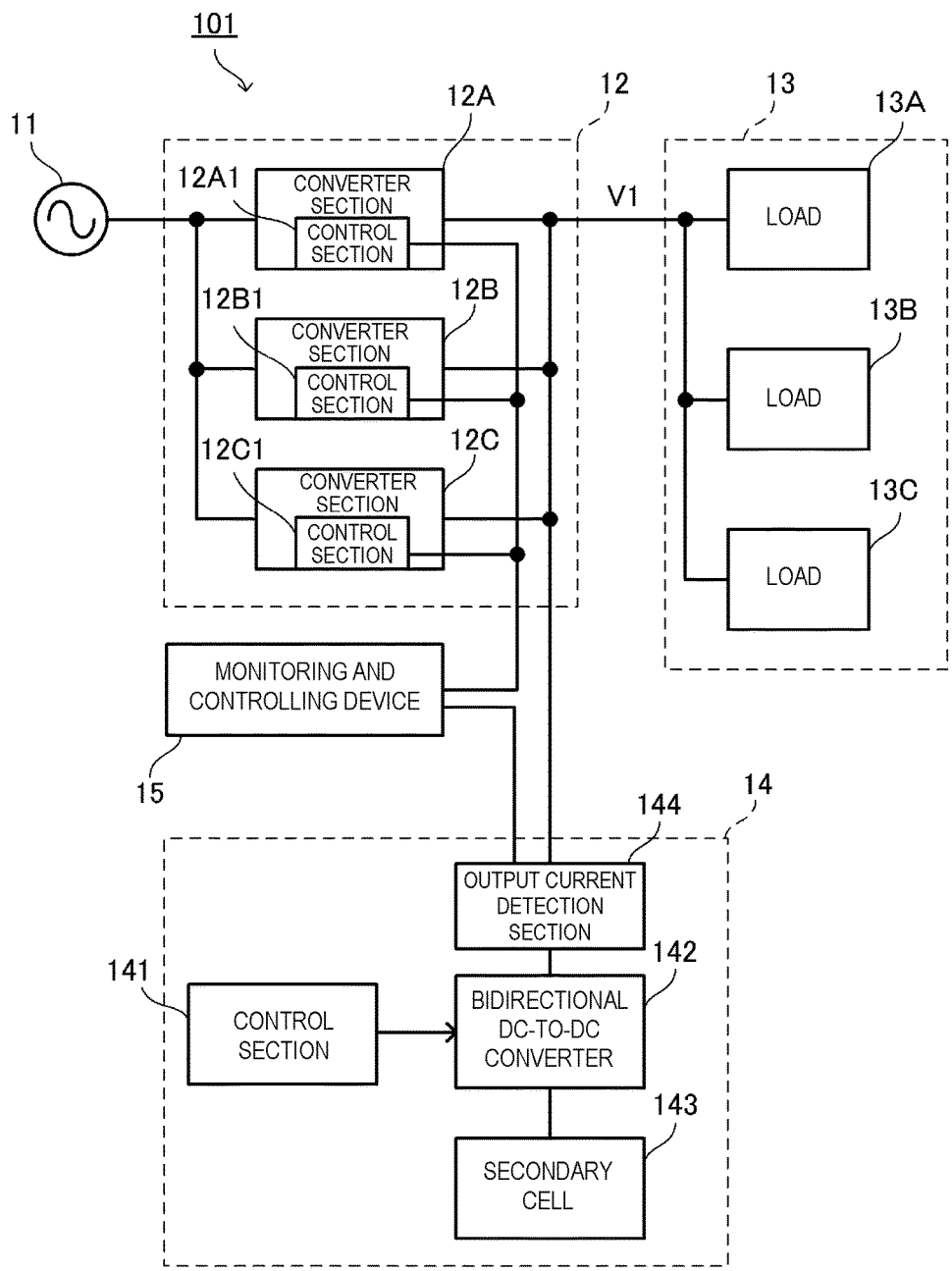
FIG. 9 is a block diagram of a power supply system according to a third exemplary embodiment.

FIG. 9 is a block diagram of a power supply system 101 according to the third exemplary embodiment.

The control section 141 in the battery module 14 in the first and second embodiments receives a current sharing signal and performs charging and discharging control for the secondary cell 143. In contrast, in the present embodiment, the control section 141 in the battery module 14 does not receive a current sharing signal, performs switching control for the bidirectional DC-to-DC converter 142, and performs discharging control for the secondary cell 143. That is, in the present embodiment, after the output voltage of the converter section decreases, the battery module 14 assists supplying power.

The monitoring and controlling device 15 receives an output current signal from an output current detection section 144 and detects discharging from the battery module 14. The occurrence of the output current in the battery module 14 triggers the monitoring and controlling device 15 to start driving the inactive converter section.

The converter unit 12 is set so as to output a constant voltage and to continue being driven while reducing the output voltage in a heavy load range, as in the second embodiment.

In this configuration, if the load changes when the converter is inactive, shortages of power supplied to the load 13 can be avoided. Therefore, stable voltage can be supplied to the load. In addition, the operating converter unit 12 enters a heavy load range, the output voltage of the converter unit 12 becomes lower than the output voltage of the battery module 14, and as a result of this, an output current occurs in the battery module 14. Because the output current triggers activation of the inactive converter section, the circuitry of the power supply system 101 can be simplified. In addition, if the converter section cannot be quickly activated, the power storage device assists supplying power until it is activated. Accordingly, the effects of deactivation of the converter section can be suppressed.

REFERENCE SIGNS LIST

Th1 threshold (first threshold)
Th2 threshold (second threshold)
11 commercial power supply
12 converter unit
12A, 12B, 12C converter section
12A1, 12B1, 12C1 control section (current control section)
13 load
13A, 13B, 13C load
14 battery module
15 monitoring and controlling device
100, 101 power supply system
141 control section (current value obtaining section)
142 bidirectional DC-to-DC converter
143 secondary cell (power storage device)
144 output current detection section

The invention claimed is:

1. A power supply system comprising:
a converter unit including a plurality of converters connected in parallel and a current controller configured to balance output currents of the plurality of converters and to transform an input voltage and output the transformed voltage to a load;
a power storage device connected in parallel to the converter unit relative to the load and configured to supply power to the load;
a driving stop controller configured to deactivate one or more of the plurality of converters based on a load current and current output capabilities of the plurality of converters; and
a driving start controller configured to start driving each deactivated converter,
wherein the power storage device includes an output current value detector configured to obtain an output current value of the converter unit,
wherein, when an output voltage of the power storage device becomes higher than an output voltage of the converter unit when the one or more of the plurality of converters are deactivated by the driving stop controller, the output voltage of the power storage device is supplied to the load, and
wherein the driving start controller is configured to start driving one or more of each deactivated converter when the output current value obtained by the output current value detector is at or above a load factor of 50% with respect to a rated load of the converter unit.

2. The power supply system according to claim 1, wherein the converter unit is configured to output a constant voltage.

3. The power supply system according to claim 2, wherein the power storage device is configured to increase the output voltage based on an increase in the output current value obtained by the output current value detector when the output current value is at or above a first threshold.

4. The power supply system according to claim 3, wherein the increasing of the output voltage by the power storage device triggers the driving start controller to start driving one or more of each deactivated converters.

5. The power supply system according to claim 1, wherein the converter unit is set to output a constant voltage and to continue being driven while reducing the output voltage in a heavy load range.

6. The power supply system according to claim 5, wherein the driving start controller is configured to start driving one or more of each deactivated converter after the output voltage of the converter unit starts decreasing.

7. The power supply system according to claim 1, wherein when two or more of the converters are deactivated, the driving start controller starts driving all of the deactivated converters.

8. The power supply system according to claim 1, wherein when two or more of the converters are deactivated, the driving start controller starts driving at least one of the two or more deactivated converters at once in accordance with the load.

9. The power supply system according to claim 1, wherein the driving stop controller is configured to sequentially deactivate the plurality of converters.

10. A power supply system comprising:
a converter unit including a plurality of converters connected in parallel and a current controller configured to balance output currents of the plurality of converters and to transform an input voltage and output the transformed voltage to a load;
a power storage device connected in parallel to the converter unit relative to the load and configured to supply power to the load;
a driving stop controller configured to deactivate one or more of the plurality of converters based on a load current and current output capabilities of the plurality of converters; and
a driving start controller configured to start driving each deactivated converter,
wherein, when an output voltage of the power storage device becomes higher than an output voltage of the converter unit when the one or more of the plurality of converters are deactivated by the driving stop controller, the output voltage of the power storage device is supplied to the load, and
wherein the driving start controller is configured to detect an output current in the power storage device and start driving one or more of each deactivated converter.

11. The power supply system according to claim 10, wherein the converter unit is set to output a constant voltage and to continue being driven while reducing the output voltage in a heavy load range.

12. The power supply system according to claim 10, wherein when two or more of the converters are deactivated, the driving start controller starts driving all of the deactivated converters.

13. The power supply system according to claim 10, wherein when two or more of the converters are deactivated, the driving start controller starts driving at least one of the two more deactivated converters at once in accordance with the load.

14. The power supply system according to claim 10, wherein the driving stop controller is configured to sequentially deactivate the plurality of converters.

15. The power supply system according to claim 10, wherein the power storage device includes an output current value detector configured to obtain an output current value of the converter unit.

16. The power supply system according to claim 15, wherein the power storage device is configured to increase the output voltage based on an increase in the output current value obtained by the output current value detector when the output current value is at or above a first threshold.

17. The power supply system according to claim 16, wherein the increasing of the output voltage by the power storage device triggers the driving start controller to start driving one or more of each deactivated converter.

18. The power supply system according to claim 11, wherein the driving start controller is configured to start driving one or more of each deactivated converter after the output voltage of the converter unit starts decreasing.

* * * * *